Aug 5, 1941.   J. W. GREENLEAF   2,251,355
INSULATED ELECTRICAL CONDUCTOR
Filed May 3, 1939
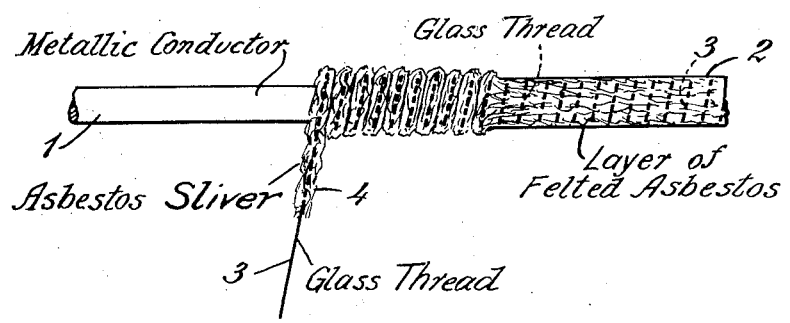
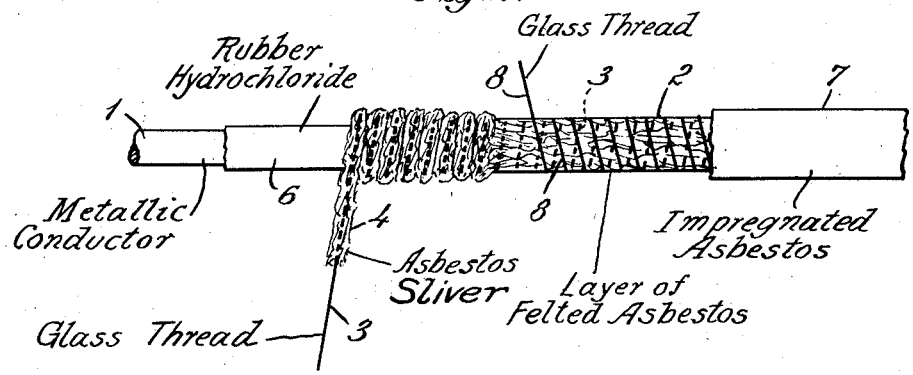
INVENTOR
John W. Greenleaf
BY
Pennie, Davis, Marvin & Edmonds
ATTORNEYS Patented Aug. 5, 1941

2,251,355

UNITED STATES PATENT OFFICE 2,251,355

INSULATED ELECTRICAL CONDUCTOR

John W. Greenleaf, Hamden, Conn., assignor to Rockbestos Products Corporation, a corporation of Massachusetts Application May 3, 1939, Serial No. 271,481

3 Claims. (Cl. 174—121)

This invention relates to electrical conductors insulated with one or more surrounding layers of asbestos, and particularly to conductors having a layer of felted asbestos. The invention aims to provide an electrical conductor comprising a continuous layer of felted asbestos supported on, or bound to the conductor with a glass thread in intimate association with the asbestos. The layer of asbestos insulation of the invention is preferably free of combustible material and the conductor may be subjected to high temperatures without impairing the effectiveness of the insulation. It may, therefore, be subjected to bending or abrasion after having been heated to relatively high temperatures without disturbing the continuity of the asbestos layer.

It has heretofore been necessary to reenforce felted asbestos insulation on conductors with a reenforcing thread of cotton, by the application of adhesive material, or by the use of a surrounding layer of other material. Such insulated conductors have had limited use because of the combustible material such as cotton and organic adhesive material and its resulting impairment when heated to high temperatures such as are frequently encountered with magnet wire and the like. There is a distinct disadvantage, from the electrical insulation standpoint, in the use of cotton (or any other organic fiber), either in the form of loose fibers mixed with the asbestos fibers or in the form of a reenforcing thread, due to its inability to withstand high temperatures without carbonizing and forming a conducting instead of an insulating material. Cotton (or other organic fiber) also produces undesirable smoke and odor during its initial subjection to high temperature, which is a cause for complaint on household appliances (ranges, waffle irons, toasters, etc.) equipped with wire insulated with asbestos yarn or roving containing organic fibers.

This invention aims to overcome the aforementioned objectionable features of the asbestos insulated conductors used heretofore.

In forming the conductor of the invention, the layer of asbestos is applied over the conductor in the form of an asbestos sliver having a reenforcing core of glass thread, or a relatively loose yarn formed of such sliver. The asbestos of the sliver adjacent the core of glass thread is free of adhesive material binding the asbestos to the core of glass thread.

I have discovered that an asbestos sliver may be formed with a reenforcing glass thread without the use of cotton fibers or an adhesive material. I have found that the fibers of a mass of asbestos may be intertwined and condensed so as to enclose a glass thread within a body of asbestos having sufficient tenacity to permit winding or twisting.

In forming the insulated conductor of the invention, I have found it especially advantageous to wind an asbestos sliver containing a glass thread helically about the conductor and to subject the conductor to a burnishing operation to compress the fibers of asbestos into a compacted smooth layer. This relatively simple method of application causes the asbestos fibers to be bound to the conductor by a helical wrapping of glass thread which is in intimate association with the fibers of asbestos.

The accompanying drawing illustrates more or less diagrammatically insulated electrical conductors embodying the invention, in which:

Fig. 1 is a side view of a conductor having a single layer of asbestos insulation; and Fig. 2 is a side view of a conductor having multiple layers of insulation.

As shown in the drawing, the metallic conductor or wire 1 is surrounded with a compacted layer of felted asbestos 2 which has in intimate association therewith a helical wrapping of glass thread 3. A part of the asbestos layer is between the wire 1 and the glass thread 3 and the glass thread binds the asbestos to the wire. A part of the asbestos layer surrounds the glass thread causing it to be embedded in the asbestos. The glass thread should be so selected for each conductor that it is sufficiently flexible to be wound around the conductor without injury and will withstand considerable bending of the conductor. Glass thread is much stronger than cotton thread and is available in many sizes and types suitable for the purposes of the invention. The asbestos is preferably applied in the form of an asbestos sliver 4 in which the fibers of asbestos enclose the glass thread 3. After the sliver has been applied, the layer of asbestos is subjected to the usual burnishing operation to compress the fibers into a compacted mass.

As shown in Fig. 2, the layer of asbestos of the invention may be used in combination with one or more layers of other insulating media. A layer of other insulating material 6, such as rubber hydrochloride, varnished cambric, etc., for example, may be applied over the conductor, a layer of felted asbestos 2 reenforced with glass thread 3, may be applied over the other insulating material, and an additional layer of asbestos 7 impregnated with a heat resistant compound over the asbestos layer 2. When combustible insulating materials are used, the insulation layer of the invention serves as a protection against a complete breakdown of the insulation when high temperatures are encountered.

As shown in Fig. 2, the supporting effect of the glass thread 3 embedded in the asbestos may be augmented by a separate winding of glass thread 8 over the layer of asbestos. This separate winding of glass thread may be applied before or after the burnishing operation, and may be wound as shown in the opposite direction to the direction of thread 3.

It is understood that the invention applies to single or multiple conductors surrounded with one or more layers of asbestos containing one or more threads of glass, or to multiple conductors in which the individual conductors are so insulated. It is also understood that the continuous layer of felted asbestos may be applied to the conductor in one operation and the supporting glass thread wound thereover in a separate operation.

The asbestos insulation of the invention may be formed in very thin layers that are capable of being heated to relatively high temperatures and thereafter subjected to considerable bending and the abrasion resulting from the vibration in electrical machinery such as motors, generators, etc., without a loosening or separation of the fibers of asbestos.

I claim:

1. A flexible electrical conductor comprising a wire surrounded by a continuous layer of felted asbestos, the layer of asbestos having been formed by helically wrapping a sliver of asbestos having a reenforcing core of glass thread around the wire, the asbestos of the sliver adjacent the core of glass thread being free of adhesive material binding the asbestos to the core of glass thread, said conductor being capable of being heated to a high temperature and thereafter subjected to considerable bending and abrasion without a loosening or separation of the fibers of asbestos.

2. A flexible electrical conductor as defined in claim 1, which comprises a glass thread extending helically around the layer of asbestos in the opposite direction to the direction of the glass thread of the said sliver.

3. A flexible electrical conductor as defined in claim 1, in which a layer of rubber hydrochloride surrounds the conductor and is in direct contact with the conductor, and in which said layer of felted asbestos surrounds, and is in direct contact with, the layer of rubber hydrochloride.

JOHN W. GREENLEAF.